United States Patent
Dragić

(10) Patent No.: US 10,989,163 B2
(45) Date of Patent: *Apr. 27, 2021

(54) DEVICE FOR CONVERSION OF WAVE ENERGY INTO ELECTRICAL ENERGY AND THE PROCESS FOR ITS DEPLOYMENT AT THE EXPLOITATION LOCATION

(71) Applicant: Mile Dragić, Zrenjanin (RS)

(72) Inventor: Mile Dragić, Zrenjanin (RS)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,501

(22) Filed: Apr. 13, 2020

(65) Prior Publication Data
US 2020/0240388 A1 Jul. 30, 2020

Related U.S. Application Data

(63) Continuation of application No. 16/091,792, filed as application No. PCT/RS2017/000001 on Apr. 5, 2017, now Pat. No. 10,641,235.

(30) Foreign Application Priority Data

Apr. 6, 2016 (RS) .................................. P-2016/0217

(51) Int. Cl.
*F03B 13/10* (2006.01)
*F03B 13/12* (2006.01)
(Continued)

(52) U.S. Cl.
CPC ...... *F03B 13/1885* (2013.01); *F03B 13/1845* (2013.01); *H02K 7/02* (2013.01);
(Continued)

(58) Field of Classification Search
CPC ... F03B 13/1845; F03B 13/1855; H02K 7/02; H02K 7/06; H02K 7/116; H02K 7/1004; H02K 7/1853; H02K 7/1869
See application file for complete search history.

(56) References Cited

U.S. PATENT DOCUMENTS 8,264,093 B2 9/2012 Moore
8,308,449 B2 11/2012 Smith
(Continued)

FOREIGN PATENT DOCUMENTS

CL 2012003391 3/2013
CN 101490341 7/2009
(Continued)

OTHER PUBLICATIONS

Search Report and Written Opinion issued in Int'l App. No. PCT/RS2017/000001 (2017).

*Primary Examiner* — Tulsidas C Patel
*Assistant Examiner* — Thomas K Quigley
(74) *Attorney, Agent, or Firm* — Barnes & Thornburg LLP; Mark J. Nahnsen

(57) ABSTRACT

Device for conversion of wave energy into electrical energy and the process for its deployment at the exploitation location, wherein the device comprises a supporting construction composed of buoyancy elements and having a supporting tube attached on the upper side. The device comprises a joint gear on the inner circumference connected with the outside surface of the supporting tube in a sliding manner and a sphere to which is the floating body pivotally connected. The device has two gears, the first flexible gear for connecting the floating body to the second gear and the second gear for connecting the flexible gear to the generator. The flexible gear consists of pulleys and a flexible element, e.g. a rope or a steel cable and the second gear can be arranged in several suitable forms, e.g. rigid elements as a set of a gear and a rack positioned inside the lower supporting tube or a flexible element, e.g. a chain and a sprocket wheel set in the buoyancy element. The supporting construction is by ropes connected to the anchor weight that is made in a form of a sphere segment either directly or through the rolling elements placed in the spherical dent of the anchor base. The invention comprises the process for (Continued)

device deployment at the exploitation location which is particularly suitable due to stable transport with low draught.

20 Claims, 19 Drawing Sheets

(51) Int. Cl.
    *F03B 13/18*     (2006.01)
    *H02K 7/02*     (2006.01)
    *H02K 7/06*     (2006.01)
    *H02K 7/10*     (2006.01)
    *H02K 7/116*     (2006.01)
    *H02K 7/18*     (2006.01)

(52) U.S. Cl.
    CPC .............. *H02K 7/06* (2013.01); *H02K 7/1004* (2013.01); *H02K 7/116* (2013.01); *H02K 7/1853* (2013.01); *H02K 7/1869* (2013.01); *F05B 2260/504* (2013.01); *Y02E 10/30* (2013.01)

(56) References Cited

U.S. PATENT DOCUMENTS

| | | |
|---|---|---|
| 2007/0126239 A1 | 6/2007 | Stewart et al. |
| 2010/0259047 A1 | 10/2010 | Chi |
| 2019/0360452 A1 | 11/2019 | Qu |

FOREIGN PATENT DOCUMENTS

| | | |
|---|---|---|
| CN | 101617118 | 12/2009 |
| EP | 2009278 | 12/2008 |
| EP | 2719890 | 4/2014 |
| GB | 1515744 | 6/1978 |
| KR | 20140093426 | 7/2014 |
| KR | 20140094268 | 7/2014 |
| WO | WO 2007/139395 | 12/2007 |
| WO | WO 2009/022930 | 2/2009 |
| WO | WO 2009/034402 | 3/2009 |
| WO | WO 2012/010518 | 1/2012 |

# DEVICE FOR CONVERSION OF WAVE ENERGY INTO ELECTRICAL ENERGY AND THE PROCESS FOR ITS DEPLOYMENT AT THE EXPLOITATION LOCATION

CROSS REFERENCE TO RELATED APPLICATIONS

This application is a Continuation of U.S. patent application Ser. No. 16/091,792, filed Oct. 5, 2018, which is a U.S. nationalization under 35 U.S.C. § 371 of International Application No. PCT/RS2017/000001, filed Apr. 5, 2017, which claims priority to Serbian Patent Application No. P-2016/0217, filed Apr. 6, 2016. The disclosures set forth in the referenced applications are incorporated herein by reference in their entireties.

TECHNICAL FIELD TO WHICH THE INVENTION RELATES

The invention relates to the device for conversion of wave energy into electrical energy and the process for its deployment at the exploitation location with the characteristics of the device adapted to the deployment process. The device in relation to the previous solutions differs particularly in the field of energy transfer from the floating body, which moves up and down, to the electric generator that produces electricity. The deployment process is based on the construction of the system suitable for cheap transportation to the place of anchoring and adaptation of the anchoring system at the seabed at the deployment location of the device for conversion of wave energy into electrical energy and having a security system to prevent accidental damage. According to IPC (International Patent Classification) the device is classified into power machines that use energy of sea waves and responds classification symbol F03B 13/12.

Technical Problem

Technical problem solved by the presented invention is the construction method of the device for conversion of wave energy into electrical energy with maximum efficiency, i.e., the degree of utilization, durability in relation to working conditions, while at the same time be made of acceptable materials and acceptable number of sub-assemblies to meet the economy requirements, i.e., to be cost effective.

These problems are well known in the prior art. A cost effective solution is difficult to find. A sustainable solution for a device for conversion of wave energy into electrical energy requires maximum efficiency of the device and at the same time minimum number of materials and minimum number of assemblies so that the system is reliable, safe to operate and inexpensive. The wave forces acting on the floating body moving up-down can be very large as it is known in the prior art, requiring a strong supporting construction and a strong chain of elements involved in the transfer of forces from the floating body to, for example, an electric generator. Another significant feature of the device for conversion of wave energy into electrical energy which contributes to the maximum degree of utilization is minimal restriction of floating body movement connected to the supporting construction of the device that is known to those skilled in this field. Considering the requirement for mobility of the floating body it seems to be in contradiction with the necessity that the construction must be strong enough to withstand high wave forces that are used to generate energy, and at the same time to be strong enough to withstand conditions on the high seas.

The invention also solves the problem of deployment of the device to the exploitation location.

THE PRIOR ART

There are many known solutions based on renewable energy sources. If observed from the perspective of the evident climatic changes on Earth, it seems necessary to avoid the use of power plants that emit harmful gases to the environment as soon as possible. European patent EP 2183478, from the same inventor as in this application, shows a device that solves some of the basic problems associated with the transfer of energy from the waves to the floating body that moves up and down. The amount of energy taken from the waves that can further be converted into electrical energy as described in EP 2183478 is maximized, but it is necessary for this device to be competitive with respect to other known devices for transformation of energy, and to be able to replace the devices for energy generation that emit large quantities of harmful gases into the atmosphere before climate changes escalate.

In relation to the above mentioned prior art the present invention is in particular different by the characteristic that the columns fixed to the seabed are not necessary, they are replaced by anchoring and also a more compact and more reliable device with better utilization is obtained by the combination of two gears. A compact and a reliable construction is achieved by a constructive solution that includes a joint linkage of the floating body and the supporting construction. The mechanism for transfer of mechanical movement is simplified and cheapen by use of a combination of a first, flexible gear, and a second gear, produced as a gear made of rigid or a gear made of flexible elements. It is not loaded to buckling and it is also possible to use only a flexible gear and thus significantly reduce negative oscillations present in long flexible gears. By the exact calculation of the moving masses the system can be easily brought into resonance zone, thereby increasing the oscillation of the floating body resulting in obtaining larger amounts of electrical energy. This provides generation of equal amount of energy regardless of whether the floating body moves up or down. The mass of the transfer element is reduced and the protection of accidental damage due to huge waves breakage is provided.

The construction of the device is improved, easier, cheaper and simplified thereby increasing the efficiency and effectiveness of the system.

DISCLOSURE OF THE INVENTION

The device for conversion of wave energy according to the invention comprises a supporting construction composed of buoyancy elements having a support tube attached to its upper side. The device includes a joint gear that on the internal circumference has a gliding connection with the outer surface of the upper supporting tube while there is a sphere fixed to the outside surface of the joint gear that is pivotally attached to the floating body. The device has two gears, first flexible gear for connecting the floating body to the second gear and the gear for connecting the flexible gear to the generator. Flexible gear can be monolithic or composed of several types of flexible gears, for example, a synthetic rope, a cable or a chain while the second gear can be arranged in several convenient ways, as a rigid gear, e.g.

a set of a pinion and a rack, a jack-screw and a nut, etc. or as flexible gear, e.g. a chain and a sprocket wheel. To transfer the movement of the floating body to the generator besides the flexible gear or the rigid gear the device includes supporting elements that ensure the proper function of the applied gear. In case when the second gear is made from rigid elements they are placed in the lower supporting tube. When the second gear is a flexible gear, e.g. a chain and a sprocket wheel, it can be placed in the buoyancy elements i.e., in the supporting construction, significantly reducing the depth of the device without anchoring elements. The supporting construction is connected to the anchor weight by anchor ropes constructed in the form of sphere segments being either directly or through the rolling elements placed in the spherical dent of the anchor base or in the form of a weight supported by supporting base.

The invention comprises a supporting construction with buoyancy elements, the supporting construction extends through the central opening of the floating body connected in such manner that it can move up and down in the longitudinal direction of the supporting construction due to the effect of waves, where the movement of the floating body is transferred to the mechanism that converts the movement of the waves into electrical energy, and the transfer of the movement is obtained through the movable joint gear placed inside the central opening of the floating body, the movable joint gear consists of a gliding joint that is in the central part constructed in the shape of a spherical surface with rings resting against it and the rings correspond to the configuration of the central opening in the floating body by their outer diameter, while on the inner diameter of the spherical surface there is a segment in the shape of a spherical surface geometrically and dimensionally corresponding to the central part of the gliding joint that is constructed in the form of a spherical surface, the connection between the floating body and the joint gear is achieved by fixing the floating body between two rings.

The spherical joint can be avoided and then the floating body is fixed to the gliding tube through which it has a possibility of vertical motion in relation to the supporting tube.

The system for movement transfer consists of first, flexible gear and the second gear that can be made up in several different forms and the additional mass that at the transformation of translational oscillatory motion of the floating body converts into rotational movement of the generator ensuring that second gear is always strained on tightening.

According to one embodiment of the invention there are two rings on the spherical surface of the joint gear that limit relative movement with respect to the longitudinal axis of the supporting construction during the movement of the joint gear due to the action of the waves, where the movement restrictions are related to the relative swiveling about two mutually perpendicular axis in the horizontal plane.

The invention may be constructed in such way that the device can be used in the electricity network, the electricity produced by this invention can be distributed to final users, or it can be used in the distribution system of electricity networks or it can be used in international electrical distribution networks, According to one embodiment of the present invention a system comprising a security system against accidental damage due to the action of extremely high waves is shown.

According to one embodiment the invention comprises braking system.

The invention also includes the process for deployment of the device at the exploitation location. Besides the phases known in the prior art which will not be described, the process also comprises phases that are new in relation to the prior art and its realization is enabled by a new construction of the device. These are the following phases:

assembling of the buoyancy elements into the supporting construction, as well as additional mass, lowering the supporting construction in the water by a crane and fixing it to the dock of the shipyard;

connecting the other elements to the supporting construction till its completion;

transport to the deployment location, whereby the stability is achieved by additional mass;

transport of the anchor weight together with the anchor base so that the anchor base floats and acts as a pontoon for the transport of the anchor base to the device deployment location;

fixing piles or building a concrete base for the anchor base;

submerging of the anchor base by opening the valves and filling it with water;

connecting the anchor weight with the supporting construction.

depth adjustment of the device, i.e., adjusting its distance from the bottom of the sea.

When the movement of the floating body is transferred to the generator by the flexible gear (without use of a rigid gear), the flexible element of the gear between the generator and added mass is carried out as differential flexible gear element so the above mentioned phase of transport takes place as the transport with small gauze.

Basic features of the invention are defined in independent claims 1 and 19, while the secondary characteristics and different construction possibilities are defined by the dependent claims. The example of the invention described by figures that follow is not a restriction in the sense that it is the only construction of the invention because, as it has been said, the scope of the invention is defined by the appended claims.

BRIEF DESCRIPTION OF THE DRAWINGS

The device for conversion of wave energy into electrical energy according to the invention will be described below in more detail with reference to the accompanying figures. The figures are also attached and they are used for better understanding of the process according to the invention, i.e., the constructional characteristics of the device enabled by described assembly and the device transport phases. The figures show examples of embodiments of the invention and should not be construed as limitation of other possible embodiments that are within the scope of protection defined by the claims. Technical characteristics according to the claims can be mutually combined in other examples of the embodiments of the structure. The drawings show the following.

DETAILED DESCRIPTION OF THE INVENTION

Figure 1:
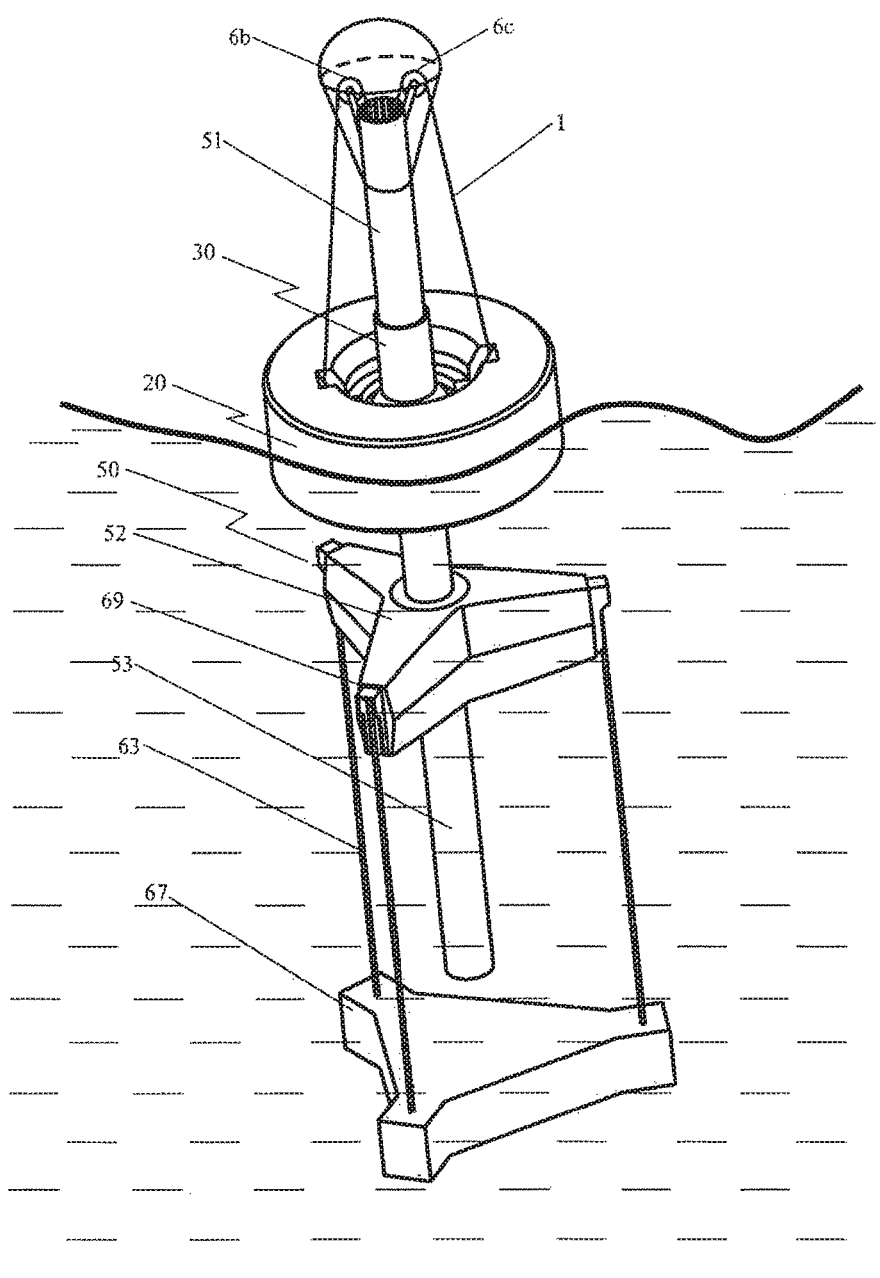
FIG. 1 shows in an isometric view an example of embodiment of the invention.

FIG. 1 shows a device for conversion of wave energy into electrical energy according to the invention. As shown, according to this embodiment the device consists of sub-assemblies. The present embodiment of the invention consists of a partially submerged supporting construction 50 comprising buoyancy elements 52, that can take a form of a star, a cylinder or any other suitable form of a closed construction, having a firmly attached supporting tube 51 at the upper side, and in some embodiments, the supporting tube 53 at the lower side. A joint gear 30 is at its internal circumference attached to the supporting tube 51, while at the outer circumference, via a ball joint, it is connected to the floating body 20, so that the movable connection of the floating body 20 is provided in relation to the supporting structure 50. Vertical movement of the floating body 20 transmits the action of the waves via a flexible gear 1, being by both ends attached to the floating body 20 and in its central part connected to the second gear located inside the supporting construction 50 or supporting tube 53, to the electric generator that may also be positioned within the supporting construction 50 or on the part of the supporting construction 50 that is out of water or in the supporting tube 53. The above mentioned term flexible gear 1 was used because the gear has a flexible, elastic element (e.g. a rope, a steel cable and the like) passing over matching rotary supporting elements (e.g. pulleys 6a, 6b, 6c) and also because the gear adjusts to the movement of the floating body 20.

Figure 14:
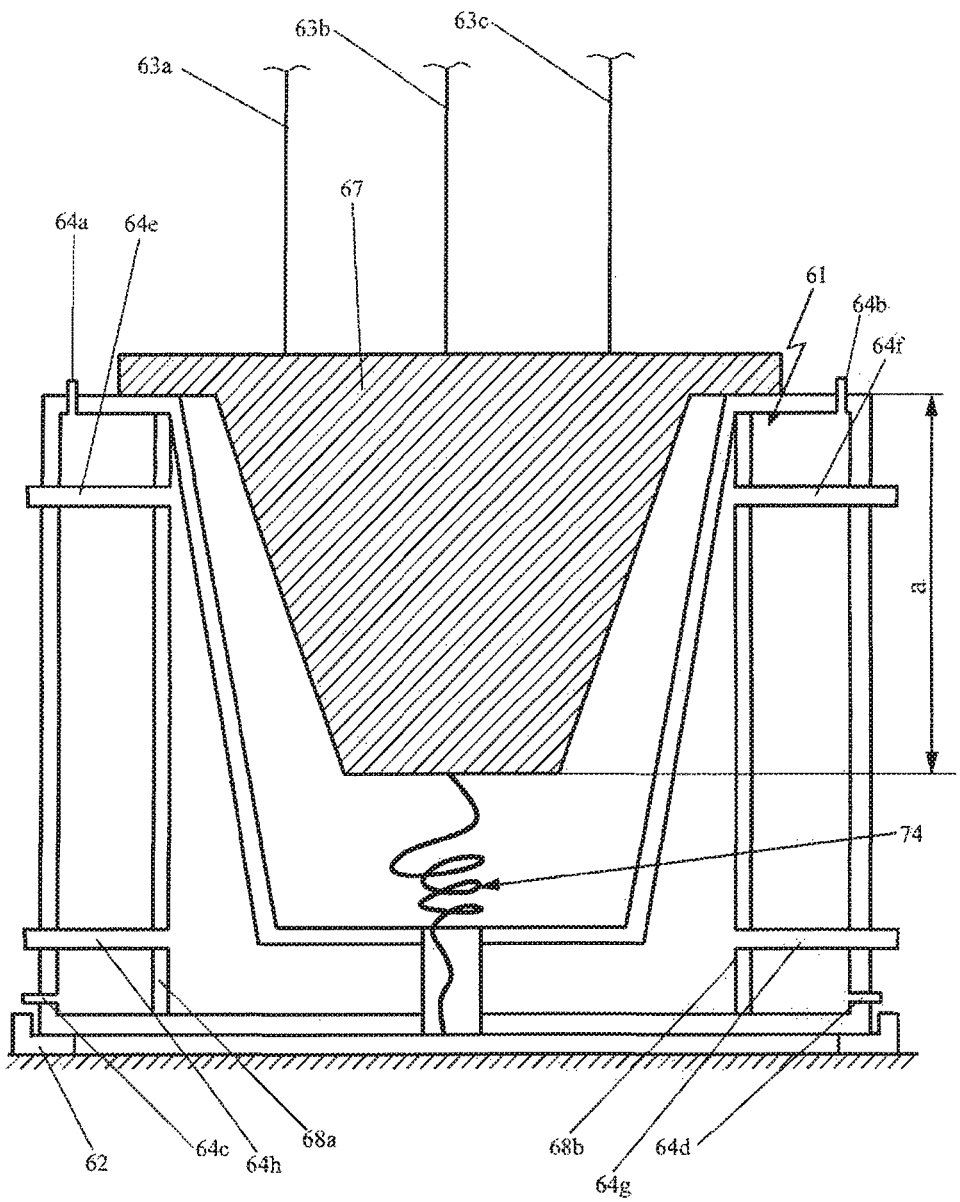
FIG. 14 shows schematically one embodiment of the anchor base for the anchor weight.
Figure 15:
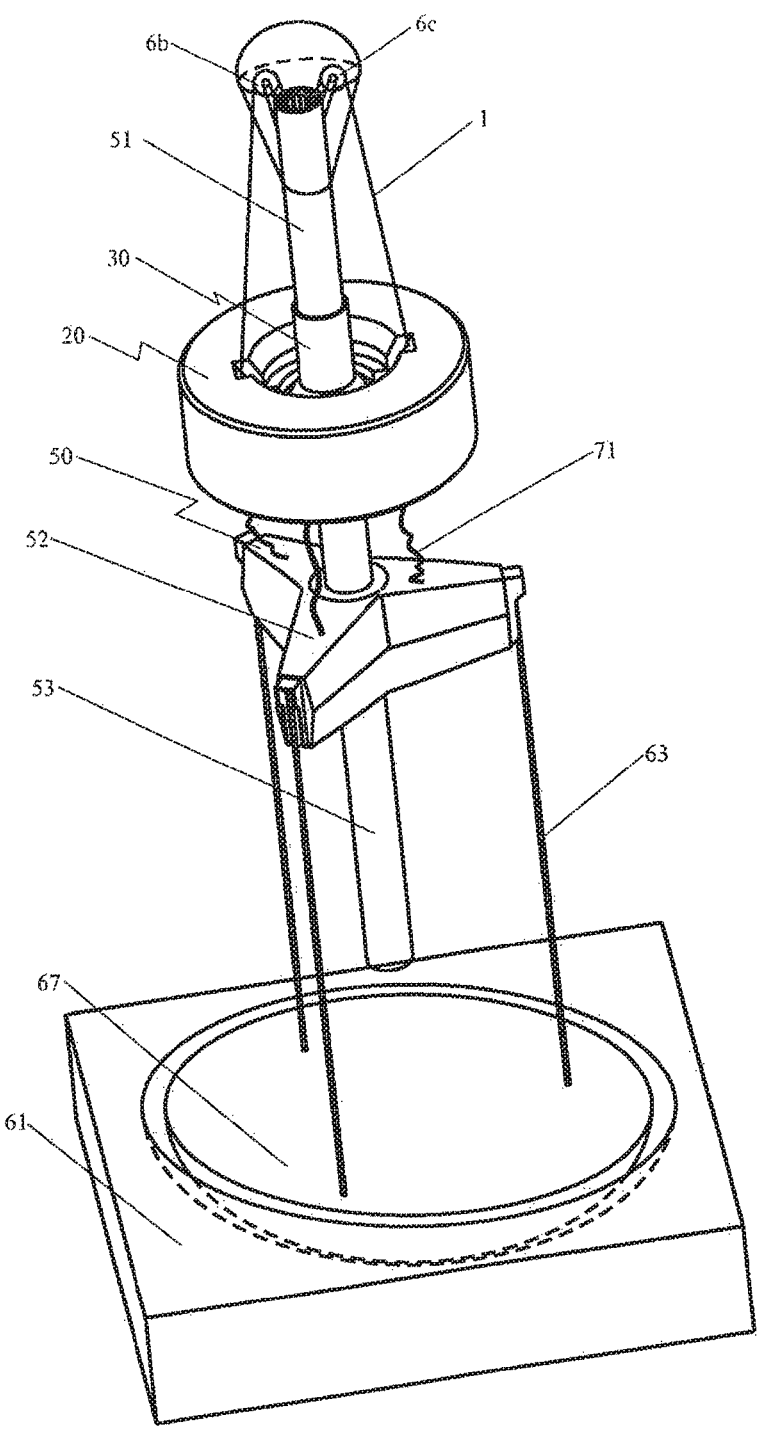
FIG. 15 shows in isometric view an example of embodiment of the invention where the anchor weight is formed of two parts, ie from the weight and the anchor base.

The supporting construction 50 is anchored by ropes 63 that are at one end connected to the supporting construction 50 while the other end is firmly attached to anchor weight 67. The anchor weight 67 may be constructed in different ways, e.g. as three separate weights. In the illustrated embodiment the anchor weight 67 is made as one segment in the form of a triangle plate. FIGS. 14 and 15 illustrate another embodiment of the anchor weight 67 positioned in the anchor base 61. In this embodiment the anchor weight 67 is in the form of a sphere segment and located in the anchor base 61 of adequate shape (see FIG. 15)

Supporting construction 50 is constructed in such manner that it has positive buoyancy (i.e., to tend to rise to the water surface) opposed by anchor ropes 63, thereby ensuring a stable position of the supporting construction 50.

FIG. 1 shows the floating body 20 cylindrical in shape. It is well known to those skilled in the art that such shape of the floating body 20 has uniform hydrodynamic pressures at all sides of the floating body 20 and therefore it is not necessary to allow the floating body 20 to rotate around its axis. Also previously described attachment system of flexible gear 1 is aimed to relieve the joint gear 30 at vertical loads transfer in a manner that the flexible gear 1 is directly attached to the floating body 20.

Joint gear 30 is made in such manner that it contains a sphere allowing the floating body 20 to rotate around all axis and to move translationally along the supporting tube 51. Joint gear 30 can have contact with the bearing tube 51 through the elements that reduce friction forces and allow the joint gear 30 to move smoothly across the supporting tube 51, these elements are wheels, bearings and the like.

Figure 2:
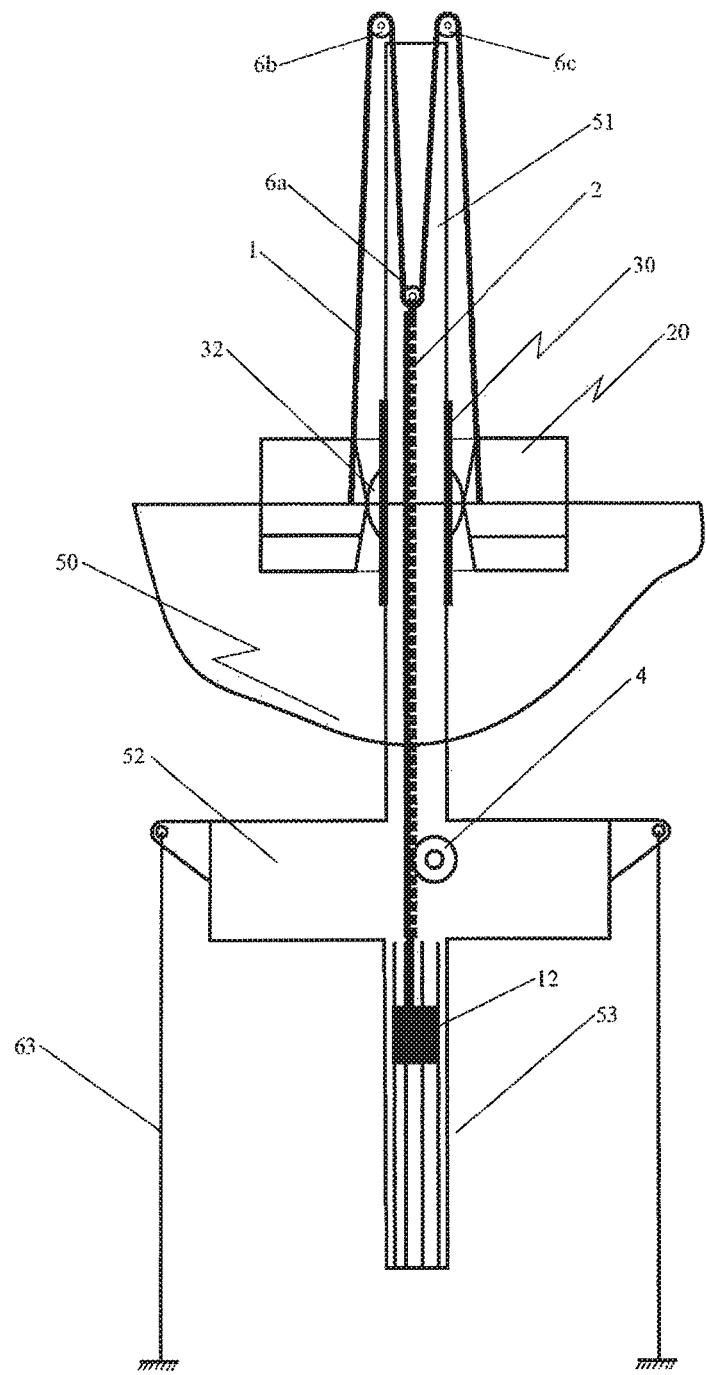
FIG. 2 shows schematically in front view an example of embodiment of the invention.

FIG. 2 illustrates one embodiment of the device for conversion of the wave energy into electrical energy where the desired rigidity of the system is achieved by the combination of the second gear (which in this embodiment is a gear from rigid elements) and the first, flexible gear 1. The flexible gear 1 is connected to the floating body 20 by its both ends, relieving the joint gear 30 which in this case does not transmit large forces of vertical movement of the floating body 20, but this is achieved by the flexible gear 1 that is directly attached to the float body 20. It is known to those skilled in this field that the flexible elements have their own rigidity, i.e., before accepting full load they deform elastically, the elastic deformations of such gears shall be taken into account in their dimensioning.

As the steel cable is sensitive to fracture and most of the curving occurs over pulley 6a, a chain can be installed in this part to operate in the zone of a large number of fractures of the flexible gear 1 over pulley 6a and then the process can be proceeded by a steel rope or other embodiment of the flexible gear.

Flexible gear 1 (e.g. a steel cable, a rope made of composite materials or a combination thereof) passes over pulleys 6b, 6a, 6c. Pulley 6a is pivotally attached to one element of the second gear, in this case rigid gear, in this example of embodiment to a rack 2 that is coupled with the gear 4 that is further pivotally attached to the electric generator via the gear of the multiplier of rotary motion. At the other end of the second, in this case rigid gear, additional mass 12 is firmly fixed, and guided within the bearing tube 53. Pulleys 6b and 6c are placed at the end of the supporting tube 51 that is out of water and firmly coupled to the supporting tube 51 by the support of the pulleys 6a, 6c, whereby the pulleys 6b, 6c rotate themselves around their axis when the flexible gear 1 moves.

During the operation, when floating body 20 starts moving upwards under the influence of waves, the first, flexible gear 1 remains strained because the additional mass 12 pulls it and because it is connected to the additional mass 12 via the second gear, and the rack 2 is connected to the second gear, the rack 2 transmits rotary motion to the generator that produces electricity through the corresponding gear 4 and the multiplier. Introduction of the additional mass 12 and the flexible gear 1 provides t the generator rotation when the floating body 20 moves both upward and downward. This is much more elegant and more efficient construction providing generation of larger amount of electricity, a larger run of the floating body 20 and a cheaper transfer mode of floating body 20 motion to the generator as compared to previous solutions where this was obtained over a rigid gear or a flexible gear 1 for both movement directions of the floating body 20. In previous solutions the rigid gear was loaded to buckling, which required a bigger, a heavier, more expensive and more complicated construction.

When moving downwards, the floating body 20 tightens the flexible gear 1 and through pulleys 6b and 6c tightens it, so that it lifts the rack 2 over pulley 6a together with the additional mass 12 and again obtaining the rotation of the gear 4 and electric energy is produced by electricity generator.

Such a combination of flexible gear 1 and the second rigid gear together with the additional mass 12 obtains constant load to stretching of the rigid gear, thereby avoiding undesirable occurrence of the rigid gear buckling. On the other hand the flexible gear 1 has the possibility of shock loads amortization that occur as a result of irregular waves.

Since the second, in this case rigid gear, is always loaded to stretching there is a possibility of its replacement by a gear with elastic, i.e., flexible elements such as, e.g. a chain with corresponding sprocket wheels or other flexible elements (a belt) and corresponding elements for circular movement realization. An example of such embodiment will be described below, so that the general name of the gear assembly that connects the first, flexible gear 1 with the generator is the second gear.

If the spherical joint is omitted, a simpler construction is obtained, but the tube 51 is more loaded and a lower degree of efficiency is obtained. Simplification of the construction by omission of the spherical joint enables omission of the pulley 6a, and because of the clearance between the sliding tube and the supporting tube 51, a rocker for equalizing forces in both cables must be put in place of the pulley.

Figure 3:
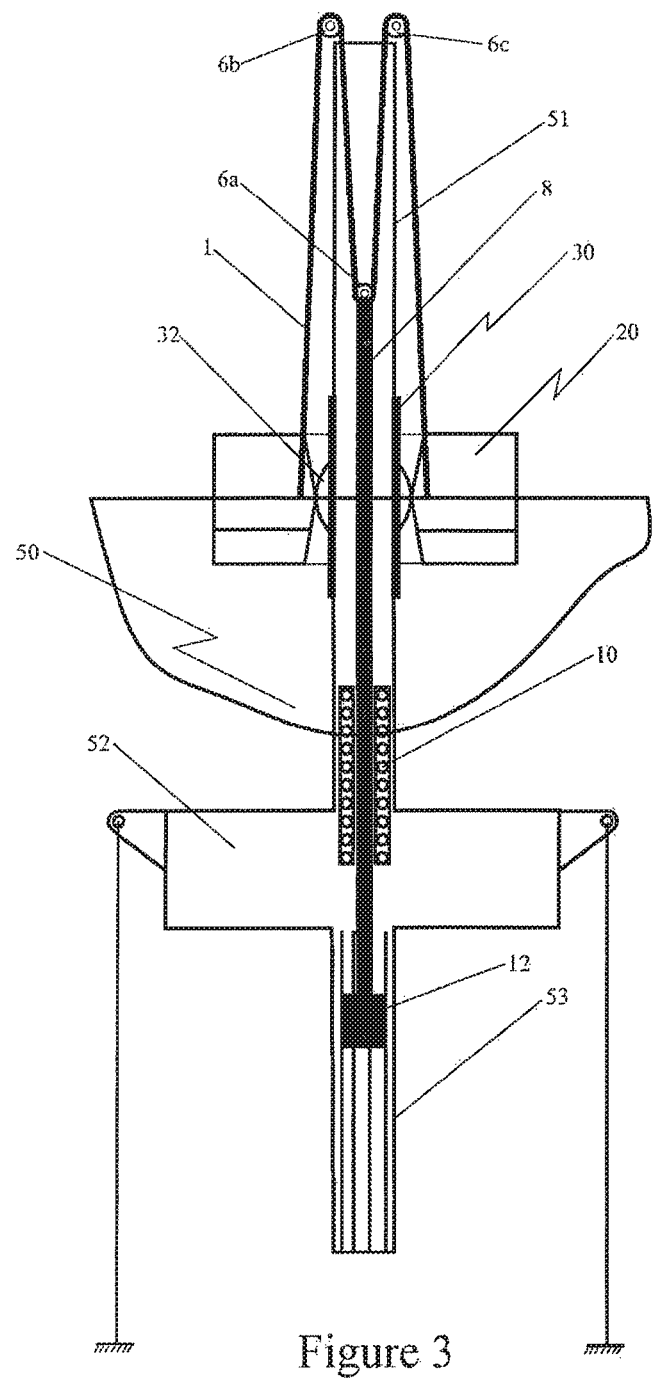
FIG. 3 shows schematically in front view an example of embodiment of the invention.

FIG. 3 shows next embodiment of the device for conversion of wave energy into electricity. In this embodiment a linear generator composed of a moving magnet 8 and a fixed coil 10 is used as the second gear. When the floating body 20 moves, the movement is transferred to the rigid gear through the flexible gear 1 and pulleys 6a, 6b and 6c, the rigid gear has the magnet 8 of the linear generator as its primary part. What distinguishes this embodiment of the device according to the invention is that the magnet 8 with a large mass as a dominant characteristic is now used as extra mass, so now the additional mass 12 can be reduced or completely omitted.

This is the simplest solution that can provide a minimum constant clearance between the magnet 8 and the coil 10, thus increase the efficiency and by proper selection of the masses the amplitude of oscillation is increased. This solution is the cheapest to maintain and application of improved and more sophisticated linear generators provides excellent technical and economic effects.

This solution stands out in comparison to all previous solutions with linear generators by the fact that the coil 10 and the magnet 8 are located within the protected area, so that the guidance of the moving part, i.e., the magnet 8 of the generator can be provided in the easiest and the safest way ensuring minimum clearance between the magnet 8 and the coil 10 with minimum risk of water penetration, which was a defect in all previous patent solutions in the prior art. This solution also enables construction of high-power linear generators.

Figure 4:
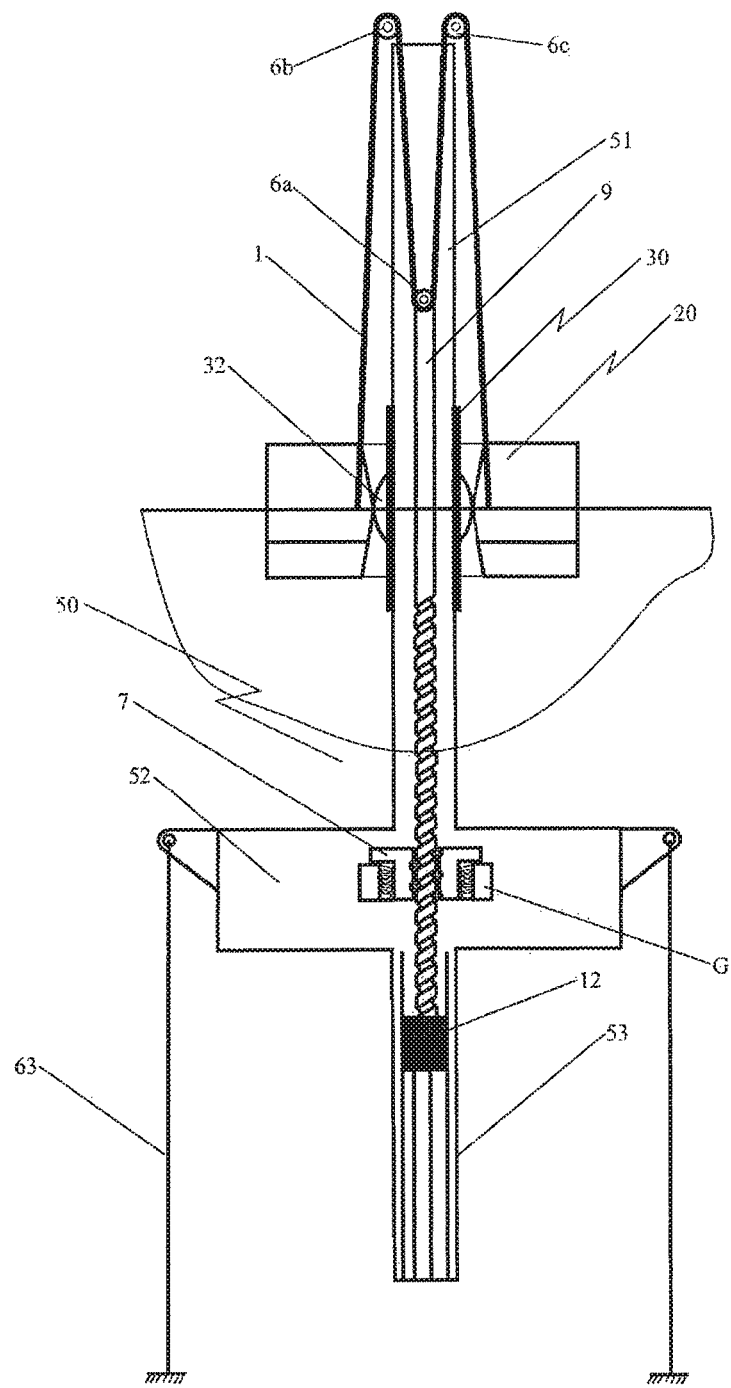
FIG. 4 shows schematically in front view an example of embodiment of the invention.

FIG. 4 illustrates one embodiment of the device for conversion of wave energy into electricity. In this embodiment a jack-screw 9 and a nut 7 with recirculation of the balls are used through which the translational movement is converted into rotary motion and further brought directly to the generator with or without a multiplier.

Inclusion of additional mass 12 at the end of the jack-screw 9 provides the same efficiency in both directions of vertical movement of the jack-screw 9 and it is provided that the jack-screw 9 can be of smaller cross sections. For these reasons the jack-screw 9 is lighter and cheaper since it is not loaded to buckling.

The choice of the angle of the jack-screw thread 9 can determine the desired rotation speed of the nut 7 with recirculation of the balls so that the nut 7 can be directly connected to the generator or it can be of such construction that the rotor of the generator is positioned directly on the nut 7. This solution simplifies the construction and the losses in the transfer system are reduced, efficiency is increased and maintenance costs are reduced.

Figure 5:
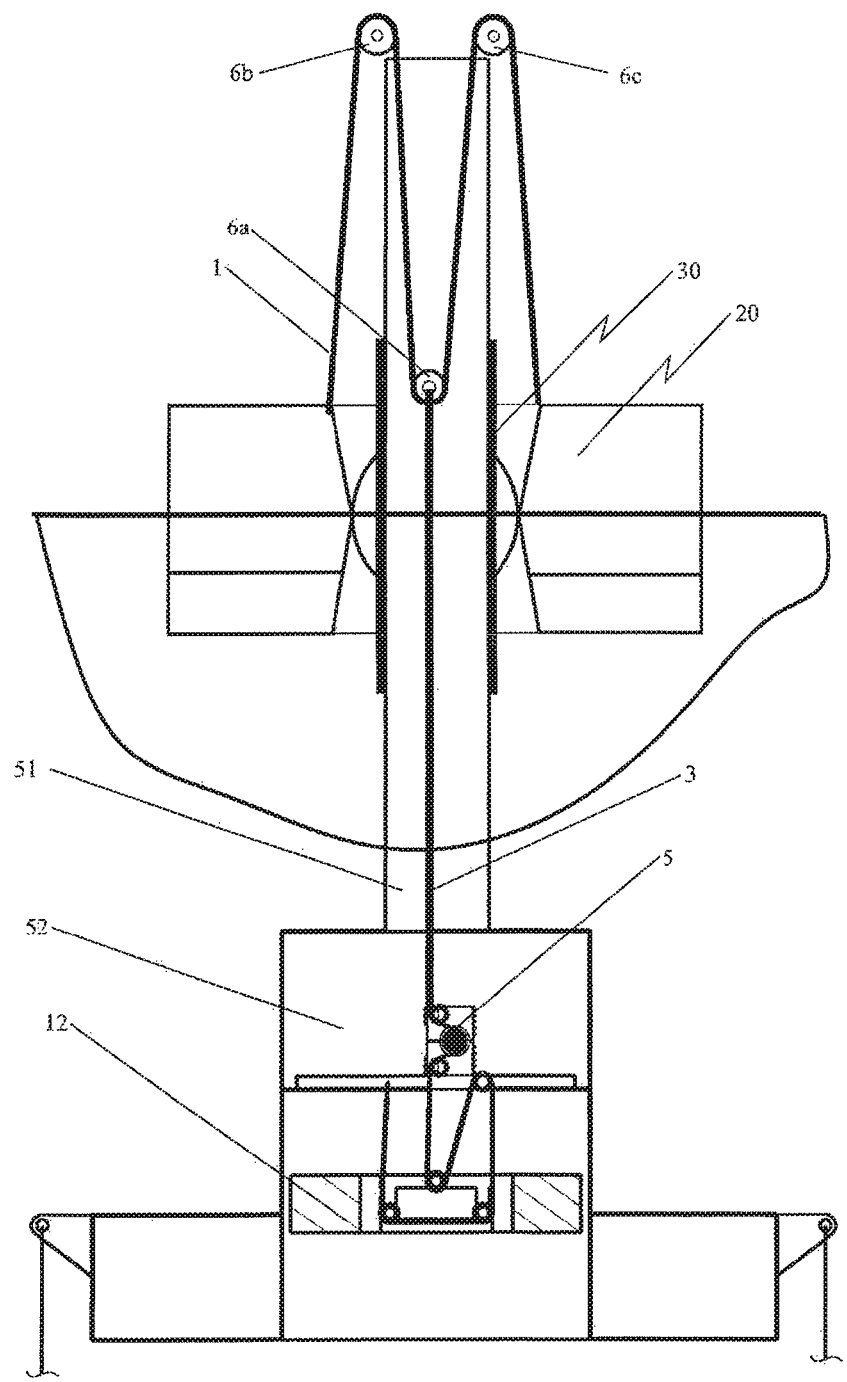
FIG. 5 shows schematically in front view an example of embodiment of the invention.

FIG. 5 shows another embodiment of the device for conversion of wave energy into electricity. In this embodiment the chain 3 and the sprocket wheel 5 are used as the second gear through which the translational motion is converted into rotary motion and further led directly to the generator. Also the adjustment of the rotation speed of the generator can be achieved by the system of parallel gears. Instead of the chain 3 any other flexible transfer element (e.g. belt) with belonging elements (e.g. belt pulleys) for conversion of linear motion into rotary motion can be applied.

Another important feature of the embodiment illustrated in FIG. 5 is that the application of differential sprocket wheels makes the lower supporting tube 53 unnecessary (the tube 53 is illustrated in the previous FIGS. 1, 2, 3, 4, 5). This is achieved by application of a differential gear that provides reduction of the additional mass 12 and therefore its speed, while the additional mass 12 is increased in proportion to the decrease of the additional mass 12.

One more very important feature of this embodiment of the device according to the invention illustrated in FIGS. 2, 3, 4, and 5, is that the combination of the size of the additional mass 12 and the mass of the floating body 20 can regulate the natural frequency of the oscillating mechanical system bringing it closer to the resonant conditions of swaying in the stormy waves.

Namely, one known defect of the spot-type devices for converting wave energy is that they, as a rule, have a natural frequency of oscillation far above the frequency of dominant (modal) storm waves that are significant for energy conversion. That is why the devices operate far in the subcritical area of oscillation, significantly reducing their effectiveness.

Figure 6A:
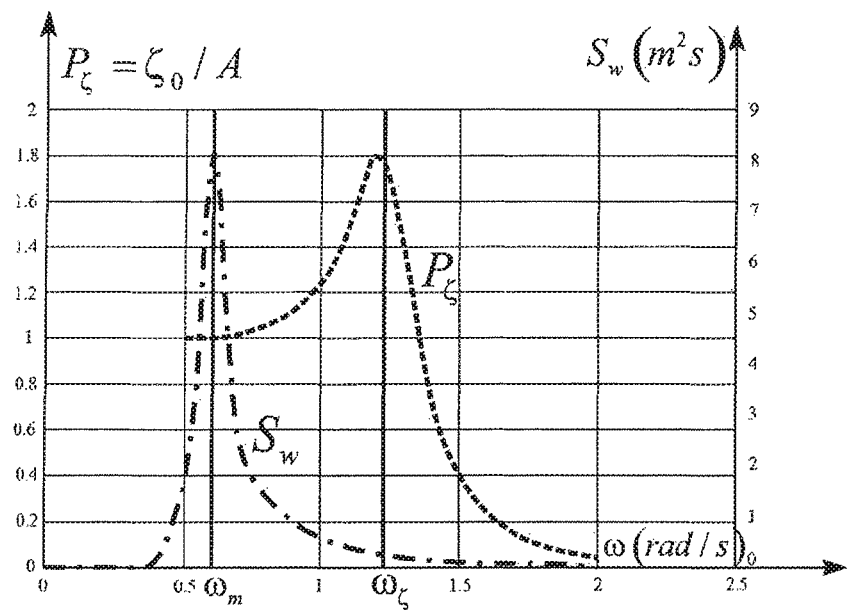
FIG. 6a shows a graph of transfer function of vertical oscillation of the unloaded device and the waves.

FIG. 6a illustrates a typical example of oscillation of floating body 20 or the buoy without a generator. Given transfer function of vertical oscillation—the dive of the floating body 20 (the ratio of dive amplitude and the amplitude of the waves) $P_\zeta$ (shown by the dashed line) and the wave spectrum $S_w$ (shown by dash-dot-dash) in the function of wave frequency ω. The resonance pitch (the extreme, maximal value, rise) of oscillation is far to the right of the wave spectrum peak, and the amplitude of oscillation in the storm is about equal to the amplitude of the waves.

Figure 6B:
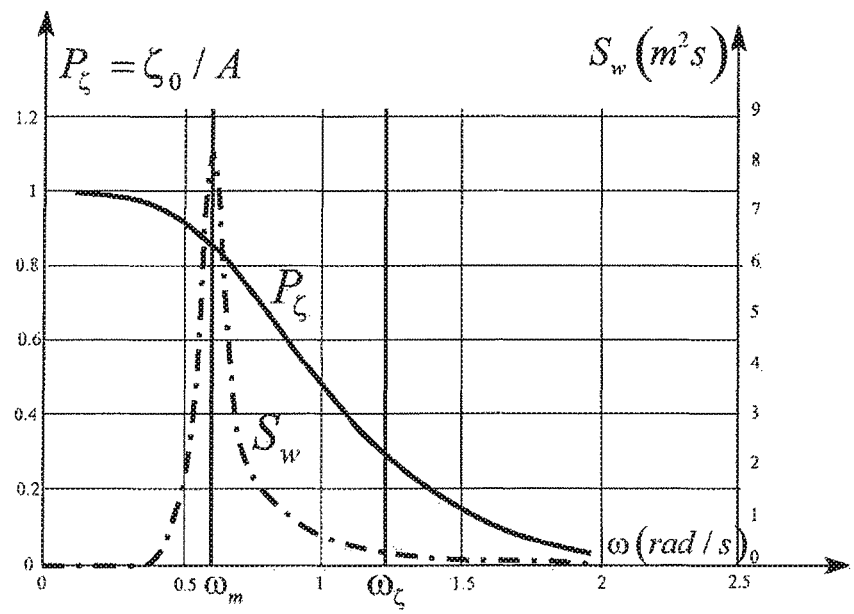
FIG. 6b shows a graph of transfer functions of the vertical oscillation of the loaded device and the waves.

A typical example of the floating body 20 spectrum coupled when the generator produces electricity is shown in FIG. 6b, where dash-dot-dash labels the wave spectrum, and the line marks dive spectrum of the floating body 20 when the device produces electricity. Due to the strong damping of the generator, the resonance pitch of oscillation does not occur any more, but the ratio of the oscillation amplitude and the wave amplitude are still close to the value of 1.

Figure 6C:
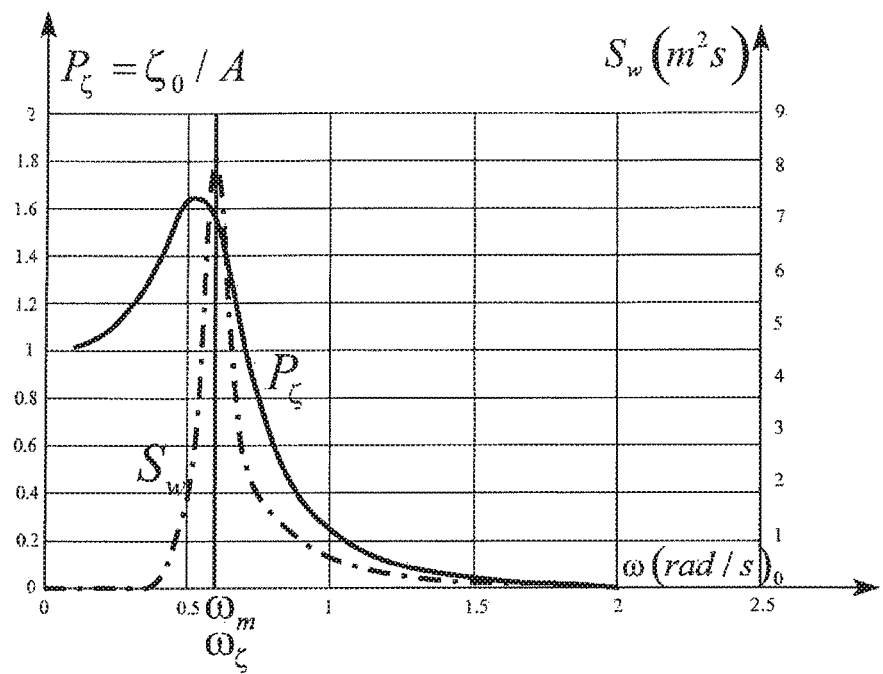
FIG. 6c shows transfer functions of vertical oscillation of the loaded device and the waves in a resonant field.

With the device with the additional mass 12 the mass of the system that performs oscillation is significantly increased, and the natural frequency of the system is decreased. It is possible, in principle, to adjust the additional mass 12 and the floating body 20 mass so that the system is in resonance with the modal waves of the storm, without changing the dimensions of the floating body 20 (the diameter and the draught). Such an example, for the case of the floating body 20 when the device produces electricity is shown in FIG. 6*c* where the wave spectrum is marked by dash-dot-dash and the buoy spectrum by the line. The transfer function of oscillation of the device with such heavy additional mass 12 has the resonance pitch despite strong damping produced by the generator. The resonance pitch practically overlaps the peak of the wave spectrum, causing (as calculations show) up to two times higher efficacy than the case without the additional mass 12. The application of the additional mass 12, as well as any increase of the mass, decreases natural frequency of the oscillating system and is beneficial to the efficiency of the device.

By the introduction of added mass 12 it is obtained that it regulates the floating body 20 draught (the height of the floating body 20 submerged in water), i.e., additional mass 12 pulls the floating body 20 out of the water. The floating body 20 has a negative buoyancy so the buoy would sink if it did not have the part that is pulled by additional mass 12.

Such construction of the device for conversion of wave energy into electricity provides good characteristics in terms of impact loads that can be transferred to the cogged set of gears 4 and the gear rack 2. On the other hand, the losses due to great length of the flexible gear 1 are maximally reduced, with every change of direction of motion of the floating body 20 the flexible gear 1 must undergo a certain elastic deformation and then start to transfer power, whereby the aforementioned elastic deformation is directly related to the length of the flexible gear 1. With the reduction of the length of the flexible gear 1 the occurrence of unfavorable vibrations that occur in long flexible gears is avoided increasing the level of utilization of the device for conversion of wave energy into electricity.

One segment of flexible gear 1 that passes through the coil 6*a* (FIG. 2) can be made of composite materials, or a chain in order to extend its continuance due to alternating bending as a consequence of the oscillatory motion of the floating body 20.

Figure 7:
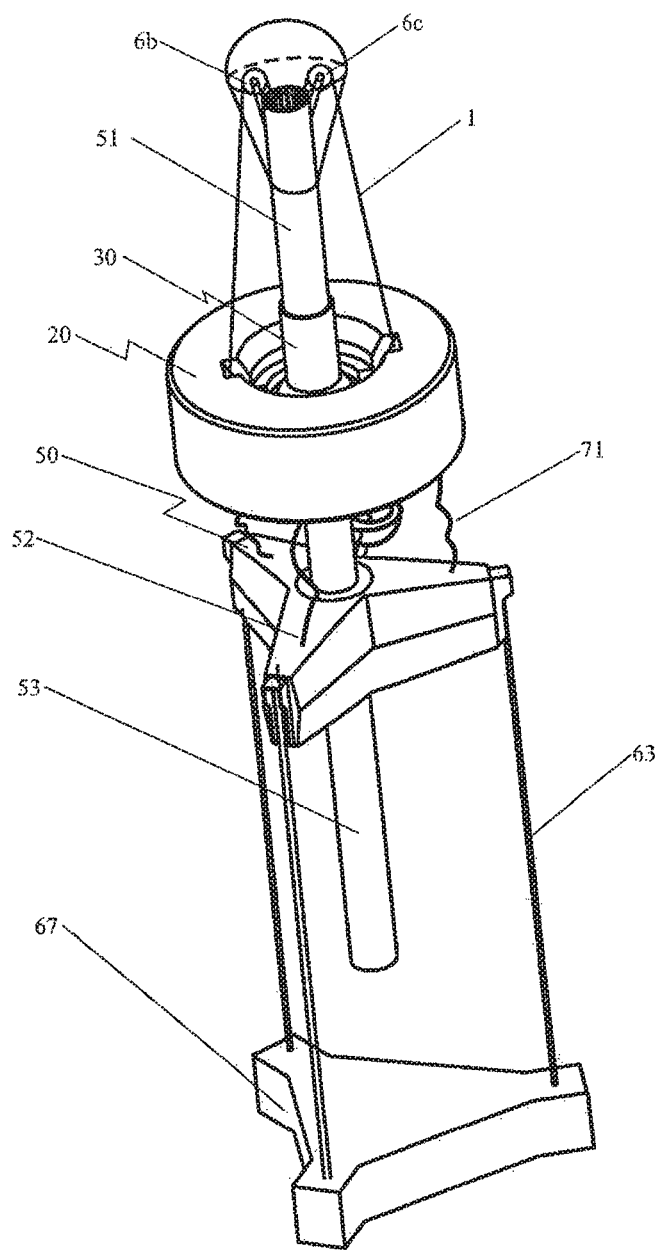
FIG. 7 shows in isometric view an example of embodiment of the invention.

FIG. 7 shows braking system of the floating body 20 comprising flexible ropes 71, made of, e.g. steel or chains or Dynemme (high density polyethylene), connected to the bottom of the floating body 20 at one end, and at the other end attached to the buoyancy element 52.

When the large amplitude waves approach, the floating body 20 moves upward and tightens flexible ropes 71. After flexible ropes 71 tighten and the floating body 20 keeps moving upward, it begins to strive to lift the complete supporting construction 50 and the anchor weight 67.

Security system is introduced in order to obtain a cheaper construction and avoid damaging the system in response to extreme waves. An electronic device for the floating body 20 tracking that at the maximum value of the allowed floating body motion puts the device in safe mode. Security mode activates safety systems such as safety ropes of the floating body 20 used to ensure that the floating body does not hit the upper part of the supporting structure, safety bearing that takes the floating body and prevents it from hitting the bottom of the supporting structure and the most important safety measure, i.e., self-submerging of the buoy.

In extreme storms with waves that have amplitude higher than the predicted work stroke of WEC device (Wave energy converter), stopping the floating body 20 prevents damaging of the supporting structure 50 in the manner described in FIG. 7 when the floating body 20 moves upward.

Also when waves of large amplitude occur there is a risk of floating body 20 hitting the part of the buoyancy element 52 of the supporting structure 50 that is closer to the free surface of the water.

Figure 8:
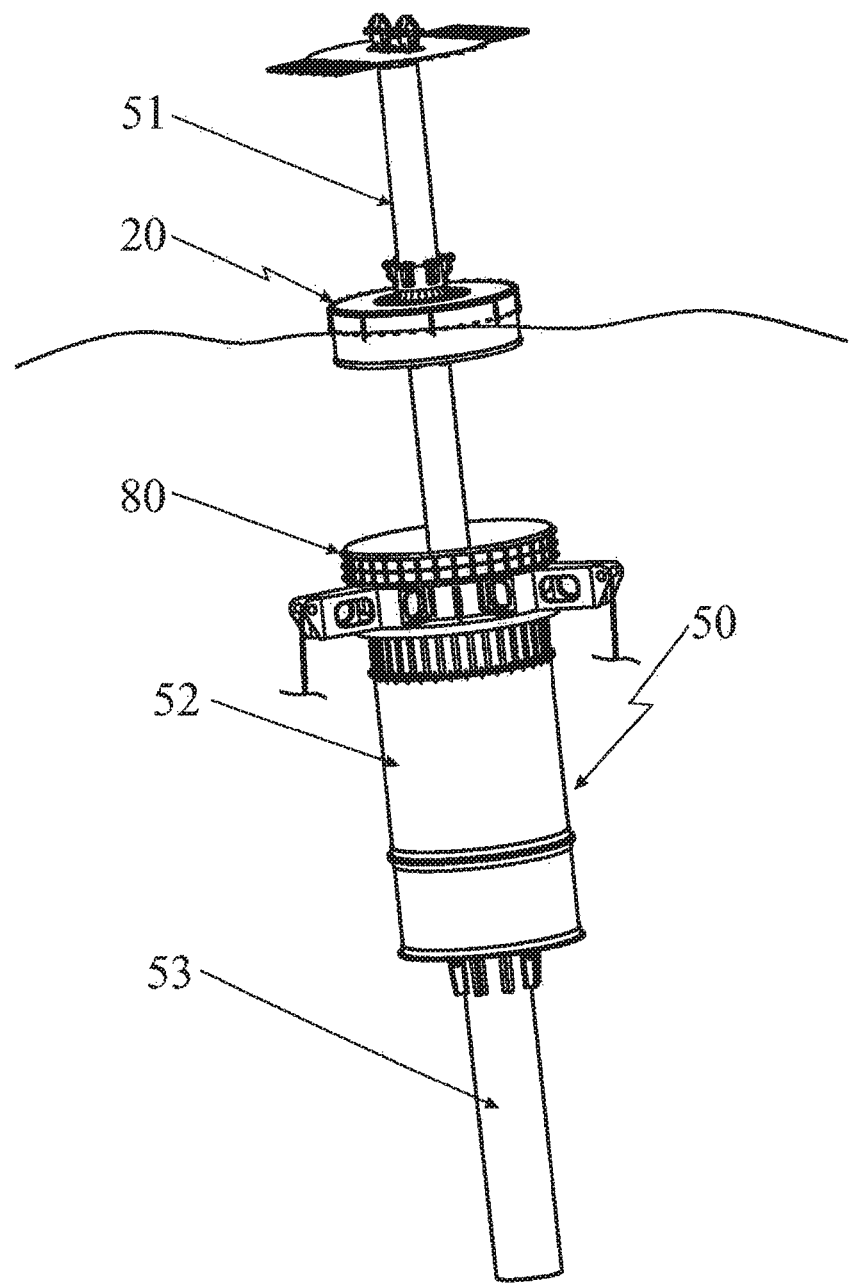
FIG. 8 shows in isometric view an example of embodiment of the invention.

This problem is solved as shown in FIG. 8: a casing 80 is set on the supporting structure 50, i.e., on the buoyancy element 52.

When the floating body 20 moves downward (toward the bottom) its braking and stopping takes place by means of hydrodynamic resistance, when the floating body 20 moves downward it enters the casing 80 that in relation to the floating body 20 has a small clearance through which water that is located within the casing 80 tends to exit, i.e., floating body 20 displaces it, due to small clearances large hydrodynamic resistance occur and brake the floating body 20. Dimensioning of the casing 80 is designed in such manner that the floating body 20 as well as the supporting structure 50 do not suffer any damage.

Figure 8A:
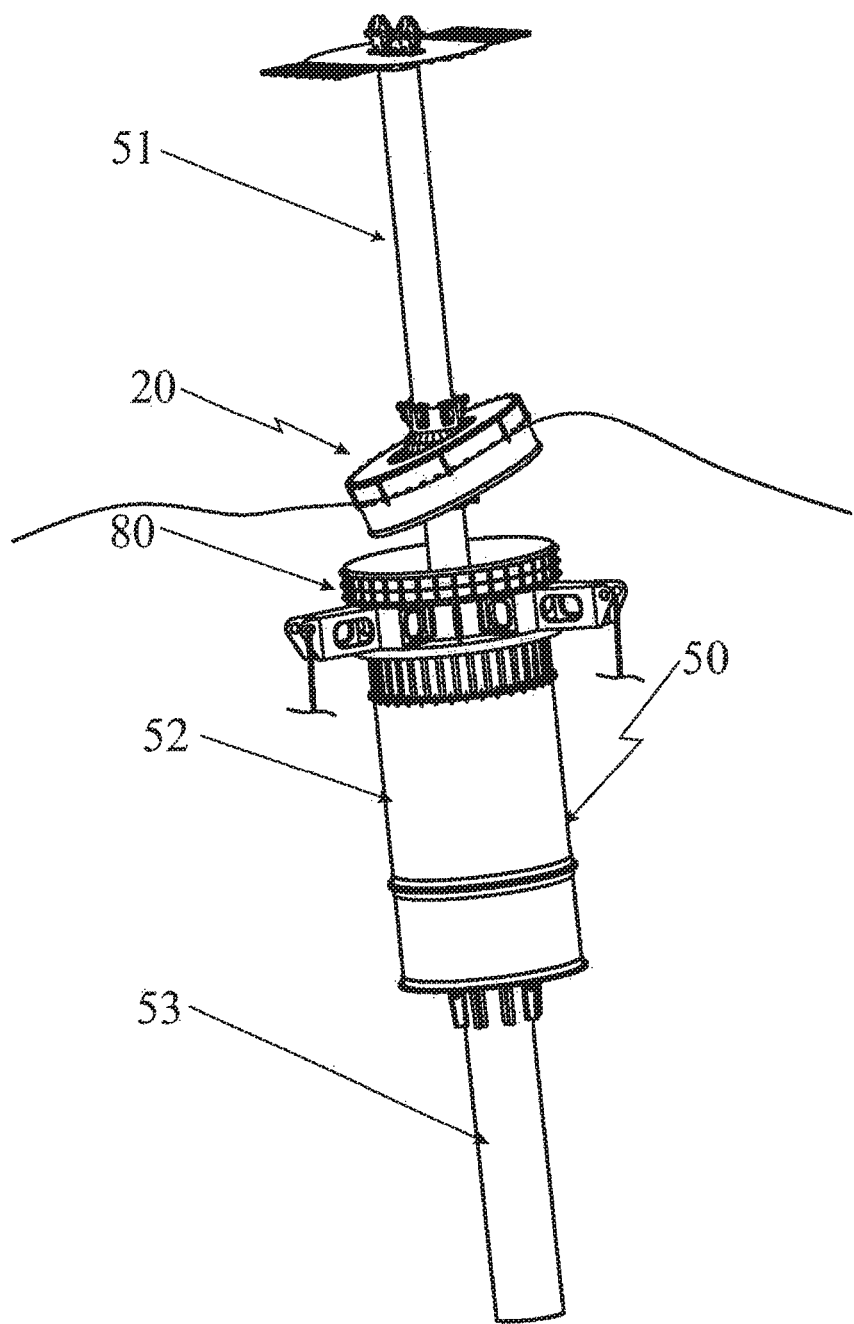
FIG. 8a shows in isometric view an example of embodiment of the invention.

FIG. 8*a* shows the case when the floating body 20 approaches the casing 80 under an arbitrary angle. In this embodiment of WEC device the edge of the floating body 20 must be strengthened in order to reduce resistance during the contact of the floating body 20 and the bottom of the casing 80, after the contact between the floating body 20 and the housing 80 is achieved, the floating body 20 starts to rotate around the center of the spherical joint 30 so that the floating body 20 is brought into a parallel position with the bottom of the casing 80 thereby ensuring equal distribution of force at buoyancy element 52 that is transmitted through the casing 80.

Figure 8B:
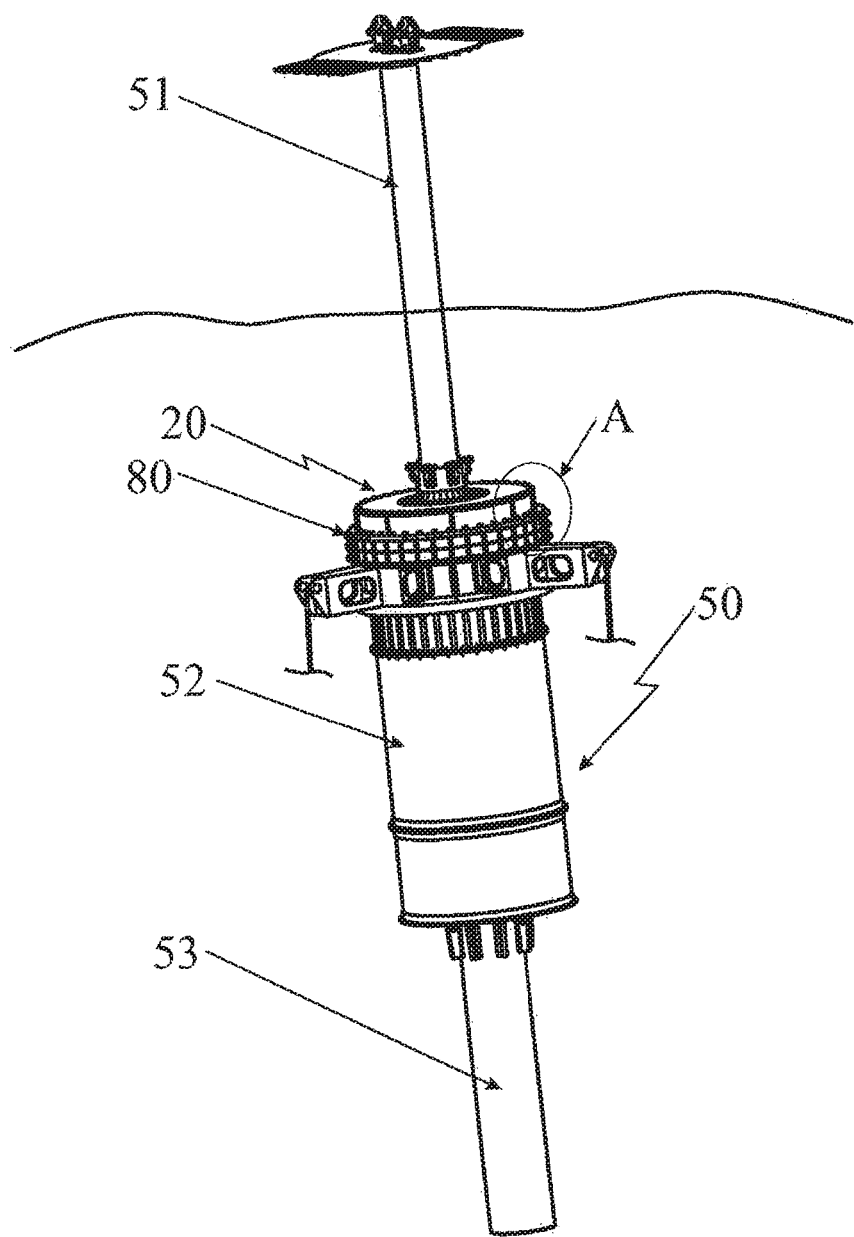
FIG. 8b shows in isometric view an example of embodiment of the invention.
Figure 9:
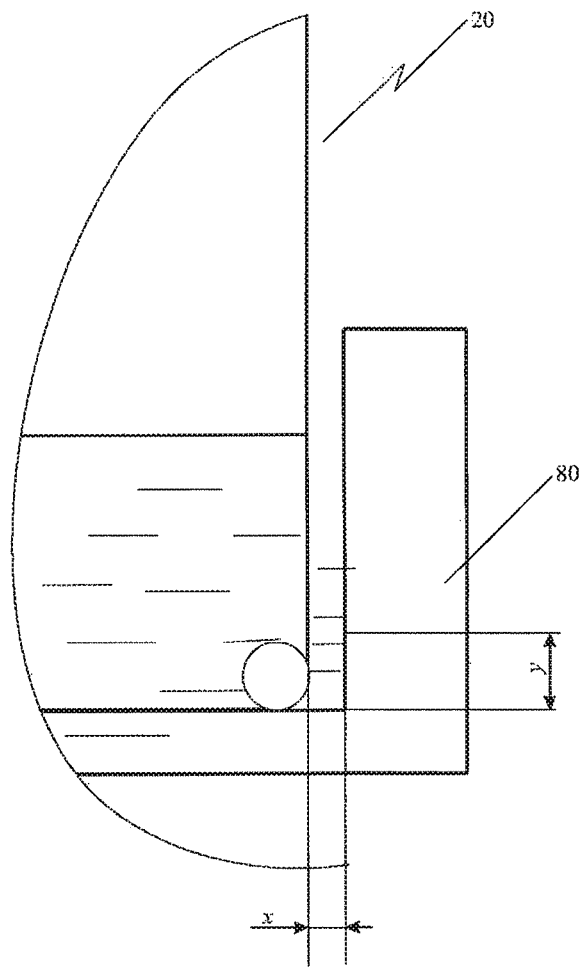
FIGS. 9 and 9a show a detail A from FIG. 8b.

FIG. 8*b* has already displayed the case when the water due to the formation of extreme waves brings the floating body 20 in contact with the casing 80, detail A of FIG. 8 is shown in FIG. 9.

The casing 80 has another very important feature, it is designed in such manner that it ensures retention of water trapped in the chambers of the floating body 20 whose function is described in detail in European patent EP 2,183,478 of the same inventor.

Ensuring of water retention inside the chamber of the floating body 20 is achieved by constructing the casing 80 with rims along the circumference (FIG. 9) so that it resembles a roasting pan. When the waters receded and the floating body 20 stops, a small amount of water between the rims of the casing 80 and floating body 20 prevents water leakage from the chamber of the floating body 20 which is necessary for the proper and efficient operation of the WEC device.

Figure 9A:
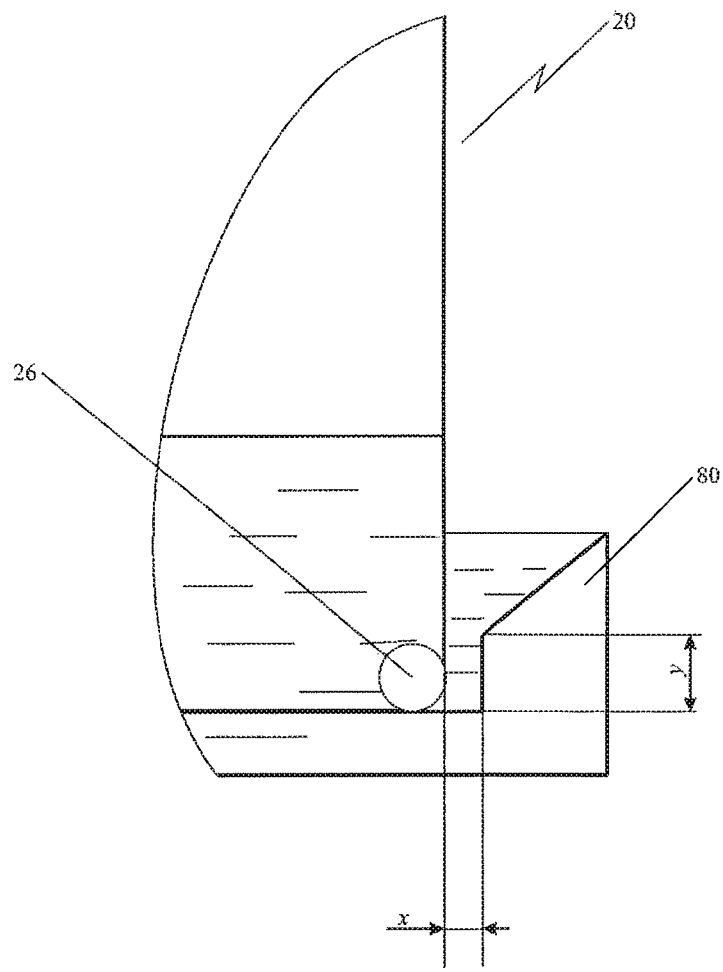

FIGS. 9 and 9*a* show detail A of FIG. 8 at the moment immediately after the big wave has approached, the water withdrew and left the floating body 20 in the casing 80, in the next moment a new wave approaches striving to lift the floating body 20 and in order to prevent the floating body 20 from bouncing and causing impact loads to the construction 50, by the clearance x between the floating body 20 and the casing 80 it is ensured that the floating body 20 lifts slowly, not fast.

Vertical wave speed is higher than the ability of water to flow through the ring of the clearance x and fill up the circumference of the ring below the floating body 20 thereby the floating body remains stuck to the bottom of the casing 80.

The floating body 20 has another important feature that contributes to the security of the WEC device. The floating body 20 does not have the ability to float independently at the free surface of water, if submerged in water independently, it sinks, i.e., the weight of the floating body is greater than the weight of the displaced liquid.

This feature of the floating body 20 is very important because in cases of extreme storms, that gradually develop over several-hour interval and may be predicted by meteorological observations, as it is known to experts in this field. Therefore, safety measures for WEC device protection are taken at the expected storm that may compromise WEC device by its intensity.

The feature of the floating body 20 that it sinks is used as safety measures.

The floating body 20 has a negative buoyancy since the mass of the displaced liquid is smaller than the total mass of the floating body 20 when it is out of water.

FIG. 8b illustrates the case of sinking of the floating body 20 in response to extreme storms. By use of automatic control the electricity generator is switched from the generating mode to the motor operation mode and through the gear 2 the additional mass 12 is lifted to the locking position, which is provided inside the buoyancy element 52, during the process of weight 12 lifting the floating body 20 sinks and comes into contact with the casing 80 where it can be secured by automatic control. In this way, the entire WEC device comprises a compact unit being under water, ie in the zone of slower movement of water particles resulting in much less resultant forces effecting the structure. This security measure ensures that the structures in extreme storms remains undamaged.

Inner brakes that hold the additional mass 12 (FIG. 8b) release the weight after termination of extreme storm, then the additional mass 12 slowly pulls out the floating body 20 and the water passes through the clearance x (FIGS. 9 and 9a) and fills the space under the floating body 20 which is formed by raising the floating body, thereby allowing a slow displacement of the floating body 20 upward and brings it to the water surface, ie into the working position. There must be a channel at the contacting surface with the casing 80 or the clearance between the rim of the floating body 20 in order to equalize the pressure in the chamber of the floating body.

A hermetic protection is placed on the top of the tube 51 preventing water from entering the tube 51.

With devices of smaller dimensions and therefore lower power the automatic control is placed on top of the tube 51 so that it is easily accessible for service because it is relatively vulnerable to failure. With devices of larger dimensions and higher power automatic control is placed inside the buoyancy element 52 where the service is provided through the upper tube 51 which is in this case hermetically sealed.

Figure 10:
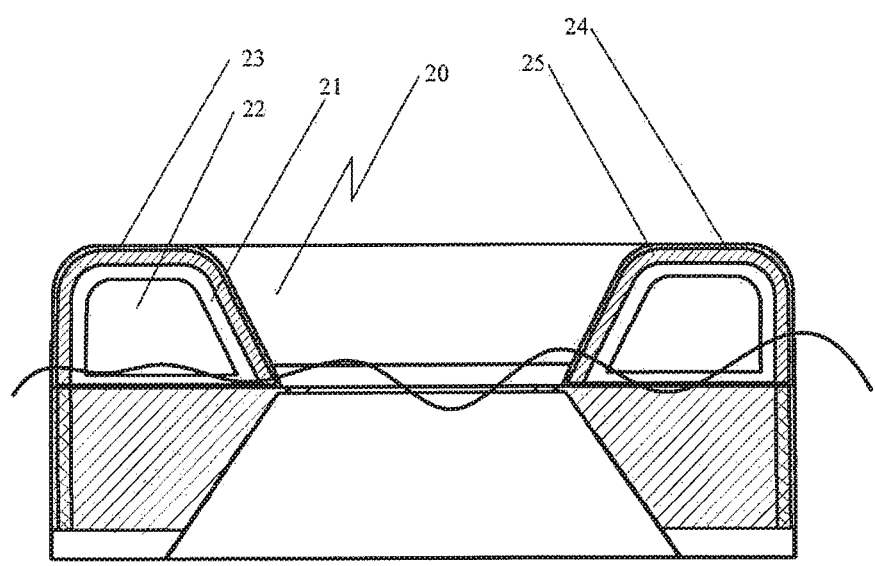
FIG. 10 shows in cross section an example of embodiment of the floating body according to the invention.

FIG. 10 illustrates an example of the floating body 20 according to the described invention comprising a steel frame 21, a closed floating chamber 22 placed above the steel frame 21, whereby a foam coating 23 is placed on the outer walls of the floating chamber 22. In the exploitation of the floating body 20 the steel frame 21 is partially below the free surface of the water marked with the wavy solid line, so that the part of the floating body 20 consisting of the floating chamber 22 and the foam coating 23 is with one part below the free surface of the water and the other part above the free surface of the water. In the case when the waves break and shock load occur due to the dive of water on the floating body 20, the foam coating 23 amortizes the impact of water on the surface of the floating chamber 22 preventing plastic deformations of the floating body 20 and significantly reducing the force that is transmitted to the spherical joint 32.

Foam coating 23 can consist of one or more layers 24, 25 of composite material to provide better amortization of the impact forces preventing any damage of the floating body 20. The combination of layers 24, 25 should be such that the layers 24, which are first exposed to the water impact have good mechanical properties in tension, while layers 25 that are closer to the walls of the floating chambers 22 should have good elastic characteristics, i.e., good dissipation of energy.

Figure 11:
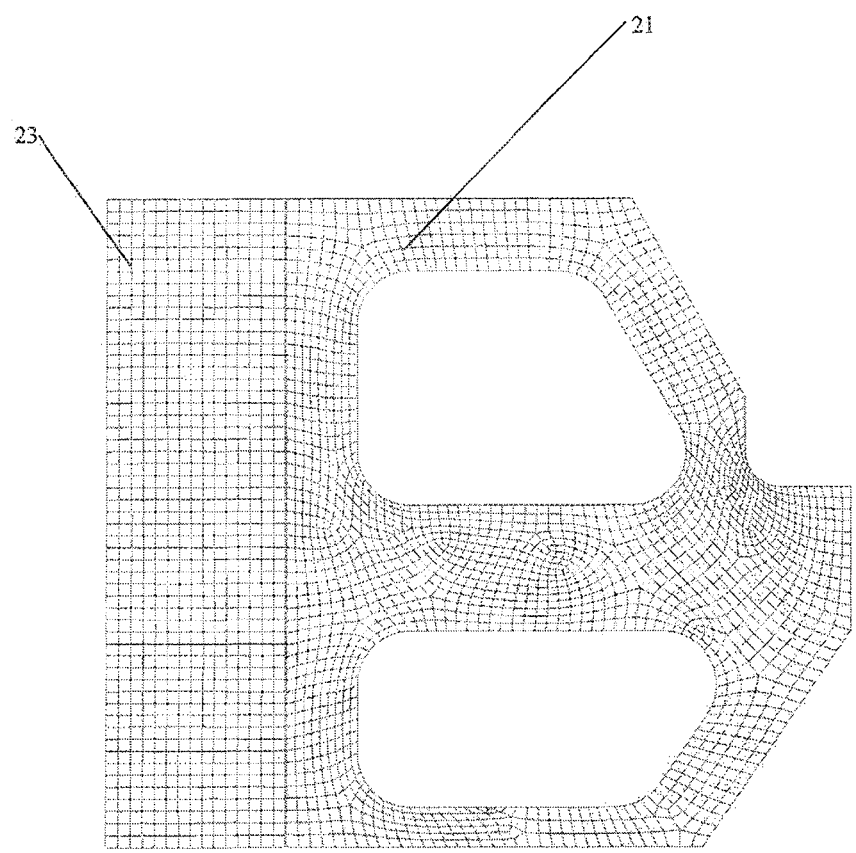
FIG. 11 shows a mechanical model of simulation of the system response at a depreciation (absorption) of impact stress
Figure 12:
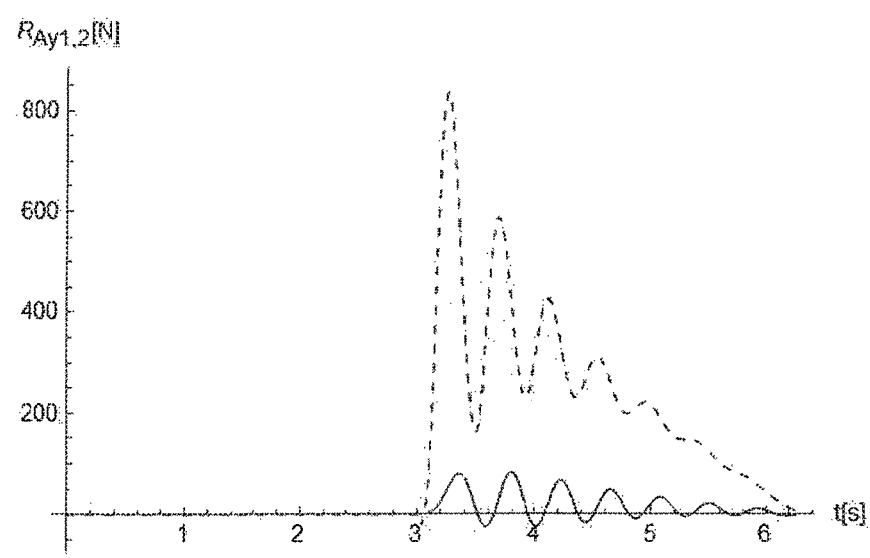
FIG. 12 shows a graph of the force to the surface of the sphere with and without foam coating.

FIG. 11 shows the mechanical model of the final elements of the simulation response of the system at amortization (absorption) of the impact load. Two-dimensional mechanical model consists of foam coating 23 stuck to the outer surface of the floating chamber 22 of the floating body 20. In the simulation (calculating) of the reaction of such model the obtained result is shown in FIG. 12 where the dashed line shows the force on the surface of the spherical joint by which the connection between the floating body 20 and the gear 30 (FIG. 2) obtained when there is no amortization of the foam coating 23, while the solid line shows the force of reaction on the surface of the sphere 32 (FIG. 2) when there is the foam coating 23. From the graphics shown in FIG. 12 it can be seen that the foam coating 23 has a very large impact on amortization of the shock load and it can be alleviated so that the reaction is up to 10 times less, resulting in a lighter and cheaper construction that can withstand the harsh conditions on the oceans.

Due to relatively small depths in the shipyards, known to those skilled in this field, it is necessary to find a mode of transportation to the location of deployment of a large dimension device, that is very heavy and has a large draught. For these reasons the present invention also relates to the process of deployment of the device for conversion of wave energy into electricity at the location of its exploitation. This deployment process includes characteristic stages of the assembly and transport. Although the device can be installed in the manner known in the prior art the construction itself has provided a new mode of setting, i.e., a stage in the assembly and transport that in their characteristics differ from modes of setting of the device from this field known so far.

In the systems with the rigid gear the protected space under the place of transfer of the torque must be provided, usually in the generator level, the supporting tube 53 must be as minimally long as the rigid gear 4 (FIG. 2).

All this requires more robust construction, higher cost of production and transportation to the deployment location.

Figure 13:
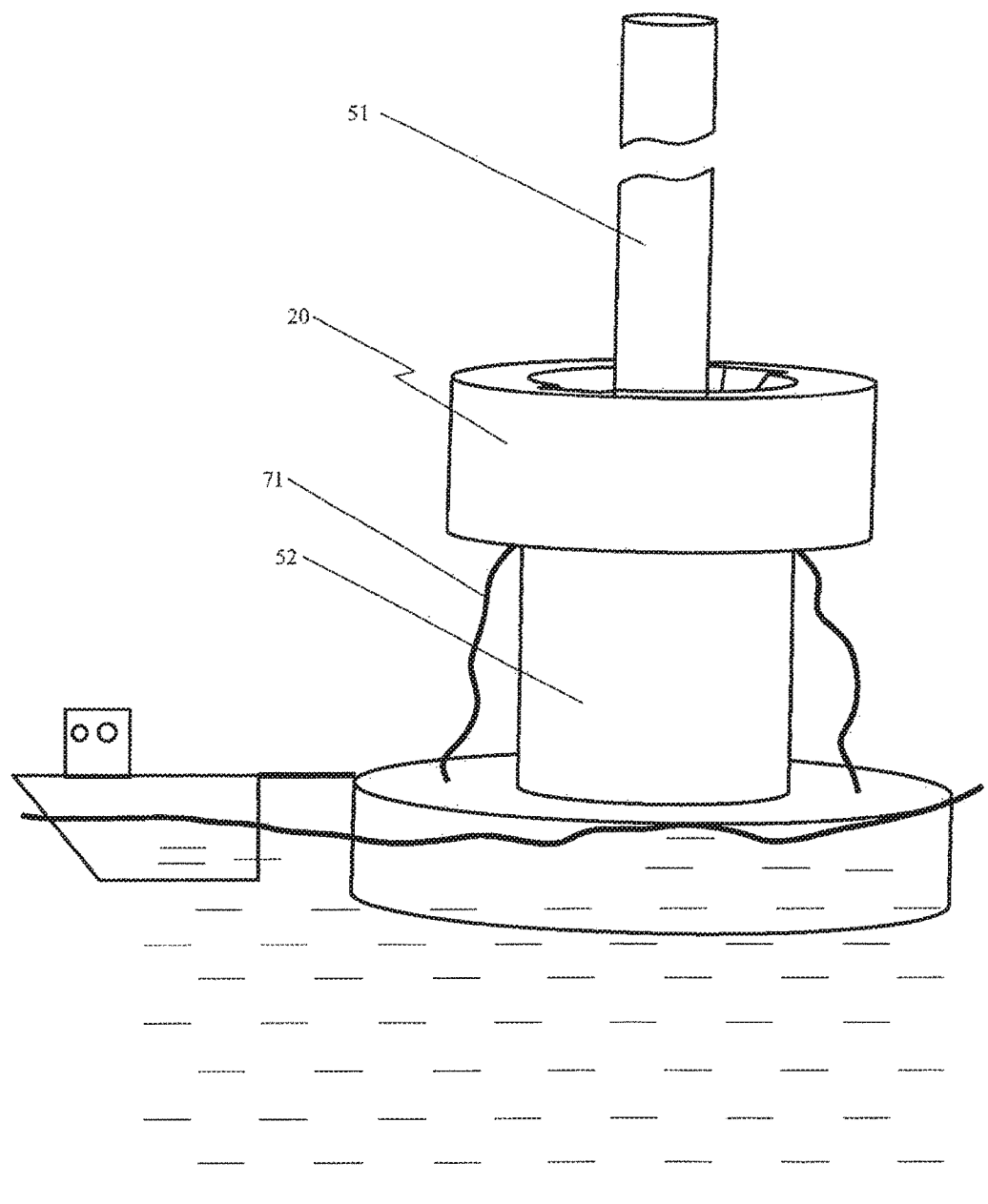
FIG. 13 shows in an isometric view a mode of the device transport from the shipyard to the deployment location.

FIG. 13 shows the support structure 50 transport mode that provides a relatively inexpensive transport to the desired location, without additional large ships, which are very expensive, then the correct transport of the device in shallow water. In this way, the water power (hydrostatic pressure) is used for taking large mass and there is no need for high-performance cranes to manipulate the device, thereby the construction of the device for converting the energy of waves into electricity is largely cheapen.

In order to obtain a cheaper construction and cheaper transport of the system to the deployment location we introduce a new technical solution where the second gear from the pulley 6a to the additional mass 12 (FIG. 5) being in the form of a weight is also a flexible gear (e.g. a chain and a sprocket wheel). The additional mass 12 can be made from cheap materials, such as stone, concrete and the like, and the tackle system is used to reduce the displacement of the second, flexible gear 4. In this way, the long tube 53 below the generator which should be the same length as the supporting tube 51 is avoided. The solution shown in FIG. 5 enables cheaper construction since after the buoyancy element 52 is assembled it is easily lowered by use of a crane and attached to the shipyard pier where the assembly of other parts of the structure is continued.

In this case the construction can take place in almost every shipyard because it does not require great depth of water next to the pier.

The additional mass 12, due to the shorter stroke, must have multiplied mass that provides a lower center of gravity of the system providing a stable transport to the installation location with a relatively small draught. Using the increased additional mass 12 the center of gravity of the construction will be closer to the free surface of the water or below it which significantly contributes to the stability of the construction during its transportation to the anchoring location.

During the construction the device is set into the sea in the shipyard after the lower part of the construction, i.e., the buoyancy element 52 is finished, the additional mass 12 is immediately put in, and the work on the construction is continued until its final formation. The concept of a construction carried out in such way is that it can swim steadily on the water surface during the transport to the desired deployment location of the device.

FIG. 14 illustrates a similar cross-section of the anchor weight 67 with a belonging base 61 (see also FIG. 15). When sailing out of the shipyard, the anchor base 61 floats acting as a pontoon on which the anchor weight 67 is transported to deployment location of the device. After arriving at the deployment location of the device the seabed can be prepared in case the weight 67 should be removed. Depending on the seabed quality (if it is sandy, covered by mud or stone), the poles 62 can be fixed or a concrete base for placing the anchor base 61 of the anchor weight 67 is made so that, if necessary, the weight and/or a base may be raised from the sea bottom. The process of submerging of the anchor base 61 is performed in such way that it evenly, in stable position sinks to the seabed, this is achieved by means of valves 64a, 64b, 64c and 64d and baffles 68a and 68b. The anchor base 61 is constructed with a corresponding hollow that corresponds the shape of the anchor weight 67 that falls into it and can roll on it. The anchor base 61 is constructed in such manner that in case of lifting of the anchor weight 67 it ensures the smooth return to its intended position. Size a in FIG. 12 is determined in such way that in case of an extreme wave the anchor weight 67 never comes completely out of the anchor base 61.

After of the anchor bases 61 and the weight 67 are transported, the supporting construction 50 and weight 67 are connected by ropes 63 on the anchor base 61.

FIG. 15 shows isometric view of the device placed at the location where the anchor weight 67 and the anchor base 61 have spherical shape so that in extreme storms, when the weight 67 relocates from the anchor base 61, it itself can return to the original position since it is constructed in the form of a segment of the sphere.

The process for deployment of the device on the exploitation location comprises, among others, the following phases:

assembling buoyancy elements (52) into the supporting construction (50) and placing the additional mass (12) as well as assembling certain parts of the device, lowering the superposed part of the supporting construction (50) into water by use of a crane and attaching it to a shipyard dock;

coupling the remaining elements to the supporting construction (50) to the final formation of the device, transport by water of the device to the deployment location where the stability of the transport is achieved by the additional mass (12);

water transport of the anchor weight (67) with the anchor base (61) so that the anchor base (61) floats acting as a pontoon for the transport of the anchor weight (67) to the deployment location of the device;

fixing the poles (62) or construction of a concrete base for the anchor base (61);

lowering the anchor base (61) by opening the valves (64a, 64b, 64c, 64d) and filling it with water;

connecting the anchor base (67) with the supporting construction (50), by use of ropes (63)

depth adjustment of the device, i.e., adjustment its distance from the bottom of the sea.

The method is characterized in that the transport is carried out with a low draught and with relatively cheap tugboat.

Since this description contains many details, they should not be construed as limiting the scope of invention or subject matter for which protection is sought, but represent a description of the characteristics specific to various embodiments. Certain features that are described in this specification in the context of particular embodiments can be applied in combination with another embodiment. It is also valid vice versa, various features that are described in the context of one embodiment can be applied in several embodiments, separately or in any suitable combination of the selected characteristics. For those skilled in the art it is understood that certain technical elements or assemblies may not only be subject to variations and modifications of the prior art, but they may be replaced by known technical equivalents, without leaving the scope of protection defined by the claims.

The invention claimed is:

1. A device for use in a body of water having a surface and bottom, the device adapted to convert wave energy into electrical energy, the device comprising:

a support tube having a first end and a second end, the support tube having a linear axis and adapted to be oriented generally vertically when the device is in use;

a buoyant member that is in a fixed relationship with the support tube, the buoyant member adapted to be positioned under the water surface and above the bottom of the body of water when the device is in use, wherein one of the buoyant member or support tube are anchored to the bottom of the body of water;

a floating body that floats on the water surface above the buoyant member, the floating body is adapted to move linearly along the support tube toward and away from the buoyant member in response to wave action on the water surface when the device is in use;

at least one flexible element that is coupled to floating body and a linear member that is coupled to the flexible member, the linear member adapted to move along the linear axis of the support tube when the floating body is moving in response to the wave action;

a mass coupled to the linear member and adapted to move with the linear member; and an electricity generator adapted to transform linear movement of the linear member into electricity.

2. The device of claim 1, wherein the flexible element is coupled to a first end of the linear member and the mass is connected to a second end of the linear member.

3. The device of claim 1, wherein the floating body includes a pivot member that allows the floating body to pivot with respect to the support tube in response to the wave action of the water surface.

4. The device of claim 1, further including an anchor weight adapted to sit on the bottom of the body of water and the buoyant member is tethered to the anchor weight.

5. The device of claim 1, further comprising a device for braking the floating body, said braking device consisting of a flexible element attached to the bottom of the floating body, and the other end being fixed to the buoyancy element.

6. The device of claim 1, wherein the floating body consists of a steel frame having a sealed chamber and included a foam coating.

7. The device of claim 6, wherein the foam coating is composed of an external layer made of a tensile stress resistant material and an inner layer made of a shock absorbing material.

8. The device of claim 1, wherein the linear member is one of a gear rack or a jackscrew.

9. The device of claim 1, wherein the first end of the support tube extends above the water surface.

10. The device of claim 9, wherein the support tube includes at least one pulley that accepts the at least one flexible element.

11. The device of claim 10, wherein the at least one flexible element extends over the at least one pulley and into the support tube.

12. The device of claim 11, wherein the device includes a safety system that causes the floating body to submerge below the water surface when activated until the deactivation of the security measures.

13. The device of claim 1, wherein the floating body is positioned around the support tube and can pivot about the support tube in response to the wave action on the water surface.

14. A device for use in a body of water having a surface and bottom, the device adapted to convert wave energy into electrical energy, the device comprising:
   a support tube having a first end that extends above the water surface and a second end, the support tube having a linear axis and adapted to be oriented generally vertically when the device is in use;
   a buoyant member that is coupled to the support tube, the buoyant member adapted to be positioned under the water surface and above the bottom of the body of water when the device is in use;
   an anchor weight adapted to be located on the bottom of the body of water, the buoyant member tethered to the anchor weight;
   a floating body that floats on the water surface above the buoyant member, the floating body is positioned around the support tube and is adapted to move linearly along the support tube toward and away from the buoyant member in response to wave action on the water surface when the device is in use;
   at least one flexible element that is coupled to floating body and a linear member that is coupled to the flexible member, the linear member adapted to move along the linear axis of the support tube when the floating body is moving in response to the wave action;
   a mass coupled to the linear member and adapted to move with the linear member; and
   an electrical generator positioned within the buoyant member and adapted to transform linear movement of the linear member into electrical energy.

15. The device of claim 14, wherein the floating body includes a pivot member that allows the floating body to pivot with respect to the support tube in response to the wave action of the water surface.

16. The device of claim 14, further comprising a braking device that includes a flexible element attached to the bottom of the floating body at one end and to the buoyancy element at another end.

17. The device of claim 14, wherein the floating body consists of a steel frame having a sealed chamber and included a foam coating.

18. The device of claim 17, wherein the foam coating is composed of an external layer made of a tensile stress resistant material and an inner layer made of a shock absorbing material.

19. The device of claim 1, wherein the linear member is one of a gear rack or a jackscrew.

20. The device of claim 1, wherein the first end of the support tube extends above the water surface and includes at least one pulley that accepts the at least one flexible element, wherein the at least one flexible element extends over the at least one pulley and into the support tube.

\* \* \* \* \*